(12) United States Patent
Krouss

(10) Patent No.: US 6,505,905 B1
(45) Date of Patent: Jan. 14, 2003

(54) HALFTONING METHOD AND APPARATUS

(75) Inventor: Paul R Krouss, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/920,678

(22) Filed: Jul. 31, 2001

(51) Int. Cl.$^7$ .......................... B41J 2/205; H04N 1/405
(52) U.S. Cl. .......................... 347/15; 358/3.06; 358/534
(58) Field of Search ...................... 347/15, 43; 358/1.2, 358/1.9, 534, 3.06, 2.1; 382/299

(56) References Cited

U.S. PATENT DOCUMENTS 6,157,462 A * 12/2000 Fan ........................... 358/1.9
6,411,401 B1 * 6/2002 Ebner et al. ................. 358/1.2

* cited by examiner

Primary Examiner—Lamson Nguyen

(57) ABSTRACT

A method of generating with an inkjet printer system a halftone image from image data comprising a plurality of contone data values, the system comprising a printhead arranged to print drops on a print medium whilst moving relative to the print medium in first and second directions, the method comprising the steps of: generating a first plurality of halftone data, each of the first halftone data being generated from a first proportion of a corresponding contone data value; generating a second plurality of halftone data, each of the second halftone data being generated from a second proportion of a corresponding contone data value; printing drops corresponding to the first plurality of halftone data in the first direction; and, printing drops corresponding to the second plurality of halftone data in the second direction.

25 Claims, 5 Drawing Sheets

|   | A | B | C | D | E |
|---|---|---|---|---|---|
| 1 | 250 | 193 | 125 | 73 | 70 |
| 2 | 246 | 181 | 105 | 59 | 57 |
| 3 | 230 | 172 | 94 | 48 | 45 |
| 4 | 212 | 158 | 72 | 40 | 34 |

*FIG. 4a* (70a)

|   | A | B | C | D | E |
|---|---|---|---|---|---|
| 1 | 150 | 116 | 75 | 44 | 42 |
| 2 | 148 | 109 | 63 | 36 | 35 |
| 3 | 138 | 104 | 57 | 29 | 27 |
| 4 | 128 | 95 | 44 | 24 | 21 |

*FIG. 4b* (72a)

|   | A | B | C | D | E |
|---|---|---|---|---|---|
| 1 | 100 | 77 | 50 | 29 | 28 |
| 2 | 98 | 72 | 42 | 23 | 22 |
| 3 | 92 | 68 | 37 | 19 | 18 |
| 4 | 84 | 63 | 28 | 16 | 13 |

HALFTONING METHOD AND APPARATUS

FIELD OF THE INVENTION

The present invention relates generally to halftone images and particularly but not exclusively to a method and apparatus for generating and printing halftone images using ink jet devices susceptible to bi-directional misalignment errors.

BACKGROUND OF THE INVENTION

A halftone image consists of a selectively positioned arrangement of dots of fixed tone levels, which creates the illusion of a continuous tone, or "contone", image. Thus, halftoning is a process that allows a continuous tone image to be modified in order that it may be represented by a device that can only represent a finite number of tone levels.

Various halftoning methods have been devised. Initially, "dithering" or matrix-based techniques were used to halftone images. In such techniques, a two-dimensional array of values is mapped over a continuous tone image. The data in each pixel in the continuous tone image is compared to the matrix value for that pixel. If the continuous tone value is greater than the matrix value, then a dot is printed in the corresponding position in the halftone image.

Although such halftoning methods are fast, they produce images that are generally considered to be "grainy". Consequently, the methods used to halftone images have been refined over the years to yield images that are more appealing to the eye.

One such refinement is the so-called "error diffusion" halftoning process. Error diffusion halftoning is a neighborhood process. That is to say, when determining whether or not to print a pixel in a halftone image, the value of the corresponding pixel in the continuous tone image is considered together with information pertaining to pixels neighboring that pixel. This process gives rise to halftone images with reduced grain compared to images produced by dithering or matrix-based techniques. However, in this error diffusion process, the different color planes are halftoned independently. As a consequence, drops in different colors planes may inadvertently coincide, giving rise to dots of a third, undesired color. For example, cyan drops that coincide with magenta drops give rise to dark blue dots.

This effect creates a degree of graininess, which is undesirable. Therefore, the basic error diffusion technique has been further refined to introduce a dependency between the color planes to overcome this problem. "Plane dependent" error diffusion utilises an algorithm that ensures that dots in different color planes do not coincide. Thus, through the precise placement of drops, plane dependent error diffusion processes generally produce halftone images that are less grainy and more pleasing to the eye than those produced by the basic error diffusion process.

However, drop placement errors in a printing device may cause a significant decrease in the quality of halftone images produced using a plane dependent error diffusion process. Errors in drop placement may be the result of a range of causes, such as: carriage vibration; paper advance errors; printheads misdirecting drops; paper deformations; and, bi-directional misalignment. Such errors disrupt the precise placement of drops that the plane dependent error diffusion process aims to generate, giving rise to noticeable "patterning" or "lumpiness". The decrease in image quality is particularly noticeable if the drop placement errors are caused by a systematic printer error, such as a print carriage vibration or a paper advance error, which tend to produce a very noticeable pattern in the halftone image.

As is well understood in the art, it is often desirable to use bi-directional print modes when printing with ink jet printers in order to increase throughput. By bi-directional print modes, it is meant that swaths are printed as the printheads travel over the print media in each direction, as opposed to unidirectional print modes in which swaths are printed as the printheads travel over the print media only in one direction. However, bi-directional print modes not only tend to exacerbate existing drop placement errors but to cause a further drop placement error problem.

Generally, when an ink drop is ejected from a nozzle of a printhead, it is made up of a two or three individual drops. The first and the largest being generally referred to as the "head" and the remaining one or more drops, which are significantly smaller, being generally referred to as the "tail", or "satellite" drops. The drops making up the tail generally travel slower than the head. Consequently, the tail of a drop tends to be printed at a different location on the print media to that of the head. This location is further along the scan axis in the direction of movement of the print carriage at the time that the drop was ejected. When printing in a bi-directional print mode, the effect of satellite drops is to cause an apparent misalignment between drops printed in either direction, even if the heads of drops printed in opposite directions are correctly positioned with respect to each other.

Satellite drops are particularly noticeable when the overall drop volume is small, since at small drop volumes the relative proportion of the tail increases. Currently, the use of drops of ever decreasing drop volumes is increasing, in order to achiever higher print resolution. Therefore, when halftone images are generated using plane dependent error diffusion techniques and printed with bi-directional print modes, the problem of patterning increases.

It would therefore be desirable to provide method and apparatus for producing halftone images, which overcomes one or more of the disadvantages associated with the prior art.

SUMMARY OF THE INVENTION

According to a first aspect of the present invention there is provided a method of generating with an inkjet printer system a halftone image from image data comprising a plurality of contone data values, said system comprising a printhead arranged to print drops on a print medium whilst moving relative to said print medium in first and second directions, said method comprising the steps of: generating a first plurality of halftone data, each of said first halftone data being generated from a first proportion of a corresponding contone data value; generating a second plurality of halftone data, each of said second halftone data being generated from a second proportion of a corresponding contone data value; printing drops corresponding to said first plurality of halftone data in said first direction; and, printing drops corresponding to said second plurality of halftone data in said second direction.

In the present invention, the positions of dots printed in each direction of a bi-directional printing process are derived from separate sets of halftone data. Since the separate sets of halftone data are generated in separate processes, the level of dependency between the positioning of drops printed in the two directions may be significantly reduced; i.e. process of determining the positions of one set of dots may be decoupled from that determining the positions of one set of dots.

Thus the present invention provides for a half-toning method and system that is more robust to misalignments. That is to say that where misalignment occurs, the "patterning" and/or apparent change of color resulting from the systematic shift in position of the drops printed in one print direction relative to those printed in the other is less noticeable to the human eye.

The print quality of images generated using the method of the present invention may have slightly increased grain relative to certain prior art methods in which there is dependency between the placement of ink drop printed in each direction and in which no drop placement error is experienced. However, the expense and difficulty of producing printing systems that are free from such errors is in practice often not practicable. Therefore, the present invention is particularly suited for use with printer devices which use pens which are either difficult to align, or devices which are not perfectly aligned. In the first case, printers with a high number of printheads are generally considered difficult to align. In the second case, low cost printers generally have a greater tolerance in pen alignment terms in order to save costs. The present invention is also particularly suited for use in printing images with a high proportion of midtones, which are usually most susceptible to patterning brought about by the combination of systematic drop placement errors and dependent printing.

The present invention also extends to the apparatus corresponding to the claimed methods. Furthermore, the present invention also extends to a computer program, arranged to implement the methods of the present invention.

Other aspects and advantages of the present invention will be apparent from the following detailed description, together with the accompanying drawings.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIGS. 4*a–c* illustrate schematically the generation and content exemplary direction dependent color planes according to the method illustrated in FIG. 2;

DETAILED DESCRIPTION OF THE INVENTION

There will now be described by way of example only the best mode contemplated by the inventors for carrying out the invention. The following description is of an embodiment implemented using two pass bi-directional printing method and printer. However, the skilled reader will appreciate that the present invention may also be used to advantage in bi-directional print modes having a number of passes that is greater than two.

SYSTEM OF THE FIRST EMBODIMENT

Figure 1:
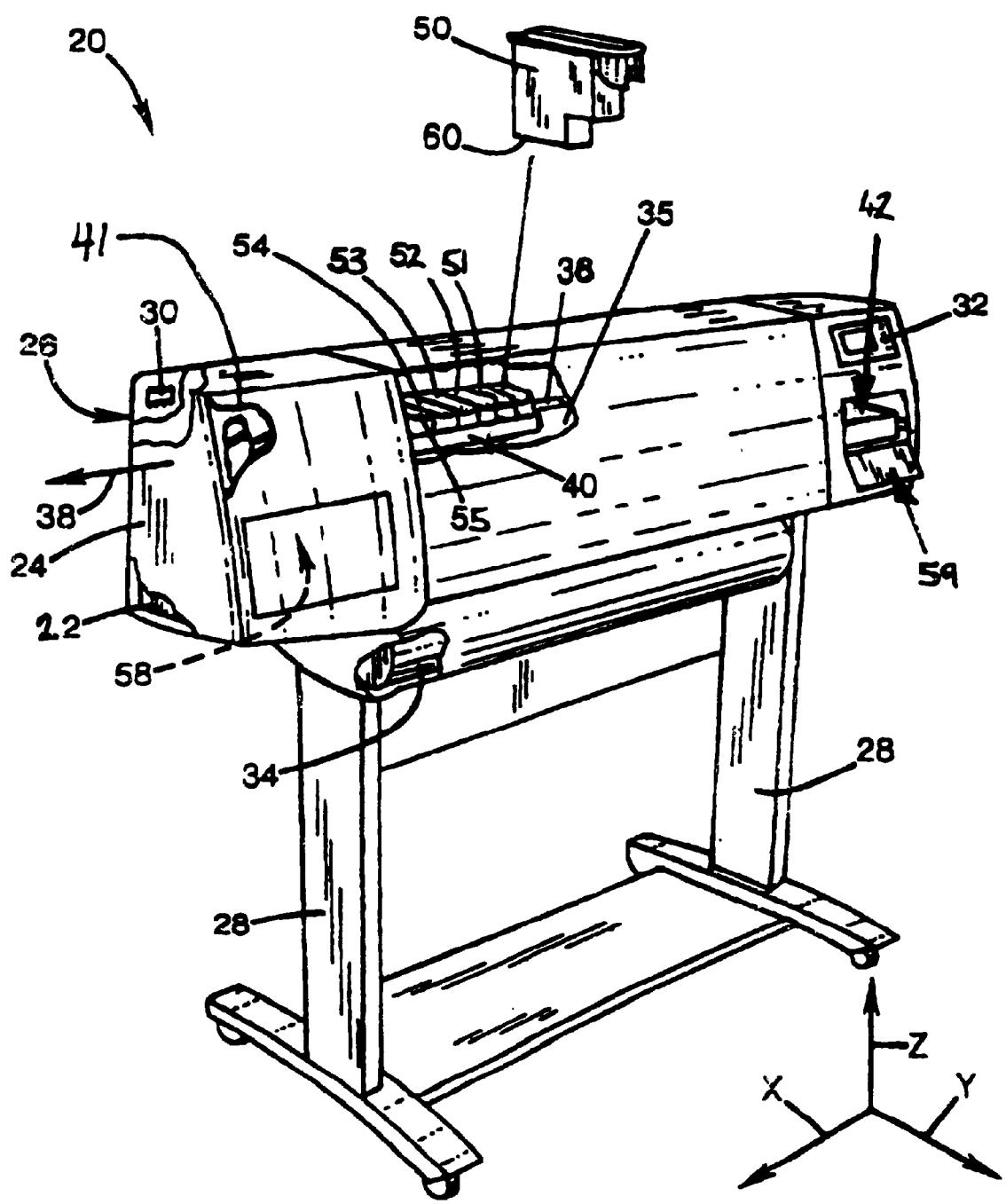
FIG. 1 illustrates an ink jet printer arranged to implement an embodiment of the present invention.

FIG. 1 illustrates an embodiment of an inkjet printing mechanism, here shown as an inkjet printer 20, which is suitable for use with the present invention. The printer 20 may be used for printing conventional engineering and architectural drawings, as well as high quality poster-sized images, and the like, in an industrial, office, home or other environment. A variety of inkjet printing mechanisms are commercially available. Examples of printing mechanisms that may embody the present invention include large format printers, office and desk top printers, copiers, and facsimile machines, to name a few. For convenience the concepts of the present invention are illustrated in the environment of large format inkjet printer 20. Commonly assigned U.S. Pat. No. 5,835,108, entitled "Calibration technique for misdirected inkjet printhead nozzles", describes an exemplary system which can employ aspects of this invention and the entire contents of which are incorporated herein by reference.

While it is apparent that the printer components may vary from model to model, the typical inkjet printer 20 includes a chassis 22 surrounded by a housing or casing enclosure 24, typically of a plastic material, together forming a print assembly portion 26 of the printer 20. Although the print assembly portion 26 may be supported by a desk or tabletop, it is preferred to support the print assembly portion 26 with a pair of leg assemblies 28.

The printer 20 also has a printer controller, illustrated schematically as a microprocessor 30 that receives instructions from a host device, which is typically a computer, such as a personal computer or a computer aided drafting (CAD) computer system (not shown). The printer controller 30 may also operate in response to user inputs provided through a key-pad and status display portion 32, located on the exterior of the casing 24. The printer controller 30 has associated memory (not shown), which may include ROM, RAM and a non-volatile data storage module, such as a high capacity hard disk drive. In this manner, image data to be printed may be stored when it is downloaded from a host device. The printer controller 30 may then process the print data as described in the method of the present embodiment and store the processed print data once again prior to the printing of the image.

A monitor coupled to the computer host may also be used to display visual information to an operator, such as the printer status or a particular program being run on the host computer. Personal and drafting computers, their input devices, such as a keyboard and/or a mouse device, and monitors are all well known to those skilled in the art.

A conventional print media handling system (not shown) may be used to advance a continuous sheet of print media 34 from a roll through a printzone 35. The print media 34 may be any type of suitable sheet material, such as paper, poster board, fabric, transparencies, Mylar™, and the like.

A carriage guide rod 36 is mounted to the chassis 22 to define a scanning axis 38, with the guide rod 36 slideably supporting an inkjet carriage 40 for travel back and forth, reciprocally, across the printzone 35. A conventional carriage drive motor 41 may be used to propel the carriage 40 in response to a control signal received from the controller 30. To provide carriage positional feedback information to the controller 30, a conventional encoder strip (not shown) may be extended along the length of the printzone 35 and over the servicing region 42, which is accessible to the user via access panel 59.

In the printzone 35, the media sheet receives ink from an inkjet cartridge, such as a black ink cartridge 50, an enlarged view of which is shown in FIG. 1, and five monochrome color ink cartridges 51 to 55. Each of the cartridges, often called "pens" by those in the art, is mounted on the inkjet carriage 40. The cartridges 51 to 55 are each arranged to print one of the following color inks: cyan; magenta; yellow; light cyan; and, light magenta. In the present embodiment, each of the pens 50 to 55 contains dye-based ink although pigment based ink could alternatively be used.

The illustrated pens 51 to 55 each have a printhead (of which only printhead 60 of the pen 50 is illustrated in the figure), which selectively ejects ink to form an image on a sheet of media 34 in the printzone 35. Each printhead has an orifice plate with a plurality of nozzles formed therethrough in a manner well known to those skilled in the art. The nozzles of each orifice plate are typically formed in at least one, but typically two generally linear arrays along the orifice plate. These inkjet printheads have a large print swath (i.e. the height of the band of a ink that may be printed in one pass of the printhead), for instance about 20 to 25 millimeters (about one inch) wide or wider, although smaller inkjet printheads may also be used.

The illustrated printer 20 uses an "off-axis" ink delivery system, having main stationary reservoirs (not shown) for each ink color located in an ink supply region 58. In this off-axis system, the pens 50–55 may be replenished by ink conveyed through a conventional flexible tubing system (not shown) from the stationary main reservoirs. In this manner, only a small ink supply is propelled by carriage 40 across the printzone 35, which is located "off-axis" from the path of printhead travel.

In the present embodiment, the printheads are thermal inkjet printheads, although other types of printheads may be used, such as piezoelectric printheads. The thermal printheads typically include a plurality of resistors associated with the nozzles. Upon energizing a selected resistor, a bubble of gas is formed which ejects a droplet of ink from the nozzle and onto a sheet of media in the printzone 35 under the nozzle. The printhead resistors are selectively energized in response to firing command control signals delivered from the controller 30 to the printhead carriage 40.

METHOD OF OPERATION OF THE FIRST EMBODIMENT

Figure 2:
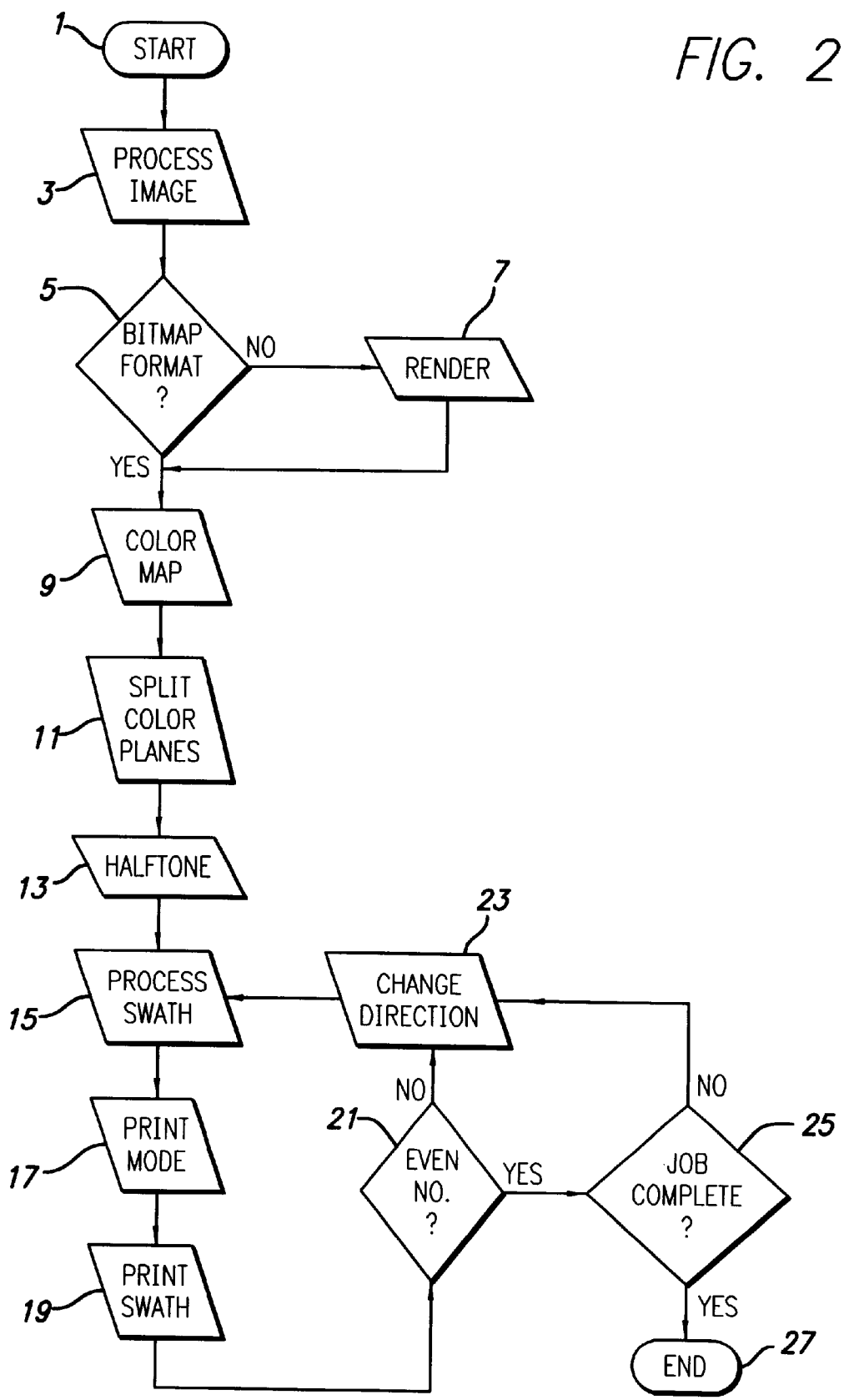
FIG. 2 shows a flow chart, illustrating the method of an embodiment of the present invention.

Referring to FIG. 2, a flow diagram representing the method of the present embodiment is illustrated.

The method is initiated at step 1. At step 3, image data relating to an image to be printed is generated or processed in a conventional manner using a suitable image processing device. In the present embodiment, this is carried out using a personal computer running an operating system such as Microsoft Window 2000™, using a graphics software application such as Adobe Photoshop™. Once the image has been generated or processed, the image data may be in any conventional format, such as a bitmap or a vector format.

At step 5 it is determined whether the image data is in a bitmap or another format. If the image data is already in bitmap form, the method proceeds directly to step 9. However, if the data is in another format, it is converted into bitmap form in a conventional rasterization or rendering process at step 7, prior to proceeding to step 9. Step 5 and the rasterization process of step 7, in the present embodiment, are carried out by the controller 30 of the printer 20. Generally, such rasterization processes are specific to the printer in question and may be implemented using hardware, software or firmware. However, the skilled reader will appreciate that this process may instead by carried out by the CPU of the personal computer, or indeed a further processing device.

At step 9, the controller 30 transforms RGB color pixel data from the original (or produced) image file to color data specific to the printing system (including the printer itself, the ink, the media etc.). Typically, the original (or produced) image file has 8 bits or 256 levels per color. In the present embodiment, this process is carried out on a conventional manner as is employed by many of the large format inkjet printers that are currently commercially available.

In the present embodiment, the printer 20 is a conventional six color CMYKcm system, employing 8 bits or 256 levels per color. As will be appreciated by the skilled reader, in practice any transformation that is suitable for use with the selected printer may be used.

In the present embodiment, the color mapping process of step 9 gives rise to six planes 70a–70f of continuous tone color data relating to the image to be printed. The color planes 70a–70f, illustrated schematically in FIG. 3a, respectively store: cyan; magenta; yellow; black; light cyan; and, light magenta color information.

FIG. 4a schematically illustrates an exemplary region of the continuous tone color data held in the cyan color plane 70a. As can be seen from the figure, the color data is stored in the form of a matrix, which corresponds to the dimensions of the image to be printed. For ease of reference, the columns of the matrix have been labelled A to E and the rows have been labelled 1 to 4. Each cell of the matrix stores the continuous tone cyan color value for the corresponding position in the image to be printed. Furthermore, as can be seen from the figure, all of the values in the matrix lie between the values 0 and 255, corresponding to the 256 possible color levels. It will be appreciated that the structure of each of the remaining color planes 70b–70f corresponds to that of the cyan color plane 70a.

At step 11, the controller 30 divides each color value held in each of the color planes 70a–70f into two discreet fractions, which are stored separately in the memory associated with the controller 30. From this point on in the present embodiment, the two fractions of each color value are processed and printed separately. A first fraction of each color value is arranged to be printed whilst the printer carriage 40 is moving in a first print direction (left to right as viewed in FIG. 1). The remaining fraction of each color value is arranged to be printed whilst the printer carriage 40 is moving in the reverse direction (right to left as viewed in FIG. 1).

Although in the present embodiment, the color mapping process of step 9 is undertaken before the step of splitting the color planes at step 11, these steps could in practice be reversed.

In the present embodiment, the process of step 11 is implemented in the following manner. For each of the color planes 70a–70f, two direction-dependent color planes are generated; one to store color data to be printed in the first direction and the other to store color data to be printed in the reverse direction. Each direction-dependent color plane is a matrix having the same dimensions as the color planes 70a–70f and, thus, the same dimensions as the image to be printed.

Taking as an example the cyan color plane 70a, a direction-dependent color plane 72a is generated to store continuous tone cyan color data that is to be printed in the first direction. A second direction-dependent color plane 74a is generated to store continuous tone cyan color data that is to be printed in the reverse direction.

Referring to FIGS. 4b and 4c, the process of generating direction-dependent color planes according to the present embodiment will now be described.

FIG. 4b is a matrix that schematically illustrates the region of the continuous tone color data held in the first direction dependent cyan color plane 72a. This region corresponds to the exemplary region of the cyan color plane 70a, shown in FIG. 4a. FIG. 4c is a matrix that similarly illustrates the region of the continuous tone color data held in the second direction dependent cyan color plane 74a. This region corresponds also corresponds to the exemplary region of the cyan color plane 70a, shown in FIG. 4a. The columns and rows of the matrices shown in FIGS. 4b and 4c correspond to those of the matrix in FIG. 4a and are referenced using the same letters and numbers, respectively. Thus, for example, the cell A1 in the matrices of FIGS. 4b and 4c correspond to the same location in the image to be printed as does cell A1 in the matrix of FIG. 4a.

The color value assigned to each cell of the first direction dependent color plane 72a is the value held in the corresponding cell of the color plane 70a multiplied by 0.6. For example, the value of "44", which is stored in the cell C4 of the matrix of FIG. 4b, is obtained by multiplying the value "72" stored in corresponding cell C4 of the matrix in FIG. 4a by the factor 0.6. However, in the present embodiment, where the product of the color value held in a cell of the color plane 70a and the factor 0.6 is not an integer value, the product is rounded up to the nearest integer number prior to being stored in the corresponding cell of the direction dependent color plane 72a. For example, the value "57" stored in cell E2 of the matrix in FIG. 4a when multiplied by the factor 0.6 yields the non-integer value of "34.2". The rounded up integer value of "35", is stored in the corresponding cell E2 of the matrix of FIG. 4b.

The color value assigned to each cell of the second direction dependent color plane 74a is the value held in the corresponding cell of the color plane 70a multiplied by 0.4. For example, the value of "16", which is stored in the cell D4 of the matrix of FIG. 4c, is obtained by multiplying the value "40" stored in corresponding cell D4 of the matrix in FIG. 4a by the factor 0.4. However, in the present embodiment, where the product of the color value held in a cell of the color plane 70a and the factor 0.4 is not an integer value, the product is rounded down to the nearest integer number prior to being stored in the corresponding cell of the direction dependent color plane 74a. For example, the value "193" stored in cell B1 of the matrix in FIG. 4a when multiplied by the factor 0.4 yields the non-integer value of "77.2". The rounded down integer value of "77", is stored in the corresponding cell B1 of the matrix of FIG. 4c.

In this manner, approximately 60% of the color value originally held at each pixel location of the color plane 70a is allocated to the color plane 72a to be printed whilst the printer carriage 40 is moving from left to right as viewed in FIG. 1. Approximately 40% of the color value originally held at each pixel location of the color plane 70a is allocated to the color plane 74a to be printed whilst the printer carriage 40 is moving from right to left as viewed in FIG. 1.

The same process is used to generate two direction-dependent color planes in respect of each of the six color planes 70a–70f. Thus, two sets of six direction-dependent color planes are generated. Thus, color planes 72a–72f are generated to store color data that is to be printed in the first direction and color planes 74a–72f are generated to store color data that is to be printed in the reverse direction. Color planes 72a–72f are schematically illustrated in FIG. 3b, and respectively store: cyan; magenta; yellow; black; light cyan; and, light magenta continuous tone color information. Color planes 72a–72f are schematically illustrated in FIG. 3c, and again, respectively store: cyan; magenta; yellow; black; light cyan; and, light magenta continuous tone color information.

It will be apparent that by rounding the values of the continuous tone color data up in the case of the values assigned to color planes 72a–72f and down in the in case values assigned to color planes 74a–74f, as described in the present embodiment, total value of continuous tone color data associated with each pixel in the image to be printed is not substantially changed.

The skilled reader will also appreciate that in other embodiments of the invention, the continuous tone color values assigned to the direction dependent color planes may store non-integer values, thus ensuring that the degree to which continuous tone color data associated with each pixel in the image to be printed is further reduced.

Returning now to FIG. 2, at step 13, the controller 30 halftones the direction dependent color planes 72a–72f and 74a–72f of the image and stores the halftone data in the memory associated with the controller 30. In the present embodiment, this is carried out using a conventional plane dependent error diffusion halftoning method. A description of a suitable plane dependent error diffusion method may be found U.S. Pat. No. 5,949,965, entitled "Correcting cyan and magenta planes for error diffusion halftoning", in the name of Hewlett Packard Company.

In this process, the continuous tone color data to be printed in the first direction is halftoned separately from the continuous tone color data to be printed in the second direction. However, in the present embodiment, the same plane dependent error diffusion halftoning method is used to halftone the data to be printed in each direction. Furthermore, in the present embodiment, the same halftoning weightings are used in halftoning the data to be printed in each direction.

Figure 3D:
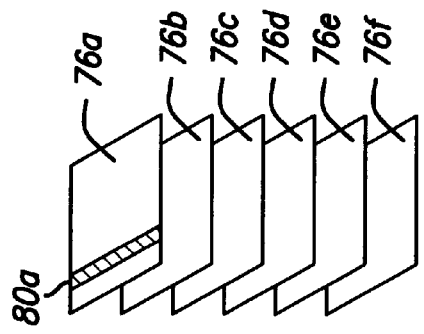
FIGS. 3*a–e* illustrate schematically the process by which direction dependent color data is created and processed in according to the method illustrated in FIG. 2.

Thus, the color planes 72a–72f are halftoned together in a plane dependent manner, giving rise to six halftone color planes 76a–76f, as are schematically illustrated in FIG. 3d. The halftone color planes 76a–76f respectively store: cyan; magenta; yellow; black; light cyan; and, light magenta color data, that is to be printed in the first direction.

Figure 3E:
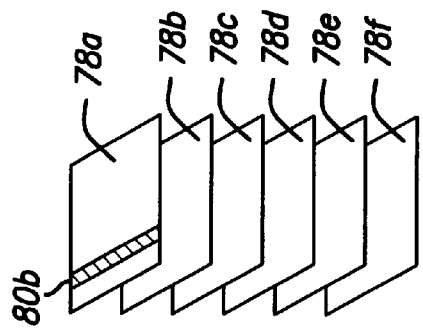
Figure 3B:
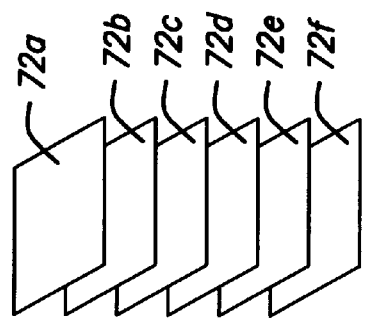
Figure 3C:
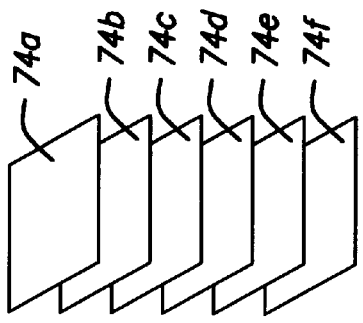
Figure 3A:
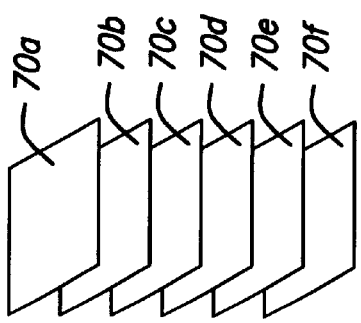

The color planes 74a–72f are also halftoned together in a plane dependent manner, giving rise to six further halftone color planes 78a–78f, as are schematically illustrated in FIG. 3e. The halftone color planes 76a–76f also respectively store: cyan; magenta; yellow; black; light cyan; and, light magenta color data, that is to be printed in the second direction.

At the conclusion of step 13, each of the halftone planes 76a–76f and 78a–78f store halftone color data having 1 bit per color and 2 levels.

At step 15 of the method of FIG. 2, the controller 30 of the printer 20 determines which part of the image data stored in the direction dependent color planes 76a–76f is to be printed in the first swath; i.e. the first pass by the carriage assembly 40 over the print media in the first print direction (left to right as viewed in FIG. 1). This process, generally known as "swath processing", is well understood in the art of conventional ink jet printers. For the purposes of illustration, the data 80a, held in color plane 76a, that contributes to an exemplary swath is schematically illustrated in FIG. 3d. It will of course be realised that corresponding "bands" of data held in each of the remaining planes 76b–76f will also contribute to the same swath as that of data 80a. The data 80b, held in color plane 76b that contributes to a similar exemplary swath is schematically illustrated in FIG. 3e.

The skilled read will appreciate that in the present embodiment, the printer 20 acts as though it is printing two images simultaneously, one in the first direction and the other in the second direction. Swaths are thus generated in the same way as generated in a traditional printer, however, alternating from on print file to the other.

In the present embodiment, as is conventional in many two pass bi-directional print modes, when each swath is printed the print media is advanced by a distance equal to half of the swath height. Generally therefore, half of each swath printed overlaps the preceding swath and the remaining half of the swath is overlapped by the subsequent swath. The first swath to be printed is generally an exception to this arrangement. In this case, the first swath is only half of the full swath height and is wholly overlapped by the half of the subsequent swath. A similar case arises with the last swath to be printed.

Therefore, the data retrieved from the color planes 76a–76f in the first swath processing step of step 15 corresponds to a band of half the full swath height arranged across the leading edge of the image to be printed.

At step 17, the retrieved data is processed according to the selected printmode in a conventional manner. As is known in the art, the printmode defines various factors that determine how the image is printed, such as the nature of the printmode mask or masks used in printing the image and the number of passes to be used.

When the print mode processing of step 17 is completed, the processed print data is printed, at step 19, as the carriage assembly 40 passes over the print media in the first print direction.

At step 21, the controller 30 determines whether an even number of swaths have been completed. As yet, only the first swath has been printed, therefore, the process proceeds to step 23. The skilled reader will of course realise that many other methods of determining the direction of printing exist, and may be used in conjunction with the present embodiment.

At step 23, the controller 30 updates an internal register identifying the data in the color planes 76a–76f which has been printed, in order to correctly identify the subsequent data in color planes 76a–76f which is to be included in the next swath to be printed in the first direction.

The controller 30 also updates an internal register indicating that the next swath to be printed is in the reverse print direction.

The skilled reader will appreciate that many methods for determining the print direction and data to be printed in the next pass are available and may be used with the present invention.

The process then proceeds to step 15 a further time, in which the controller 30 again determines which image data is to be printed in the next swath. This is carried out in a similar manner to the previous swath processing step. However, as the next swath is to be printed in the reverse print direction, the data is retrieved from the corresponding direction dependent color planes; i.e. planes 78a–78f. Additionally, as explained above, this and subsequent swaths to be printed are of the full swath height of the printheads. Thus, the data retrieved from color planes 78a–78f in step 15 corresponds to a band across the leading edge of the image to be printed, with a height equal to the swath height of the printheads.

At step 17, the controller 30 processes the retrieved halftone data for printing the reverse direction swath according to the selected print mode. In the present embodiment, the same printmode is used for print passes in both the forward and reverse directions.

At step 19, the processed print data is printed as the printer carriage 40 moves in the reverse direction back across the print media (i.e. left to right as viewed in FIG. 1).

As has been explained above, in the present print mode the print media is advanced by a distance equal to half of the swath height after each swath is printed. Thus, the upper half of this swath overlaps with the whole of the reduced height swath printed in the first pass of the carriage assembly 40.

As has been explained above, the method of the present embodiment means that the ink drops printed in the first and reverse directions are positioned in the image in a manner which is not dependent. Thus, the degree of "patterning" found in images printed according to the present embodiment remains low even if a bi-directional error is present in the system.

Figure 5:
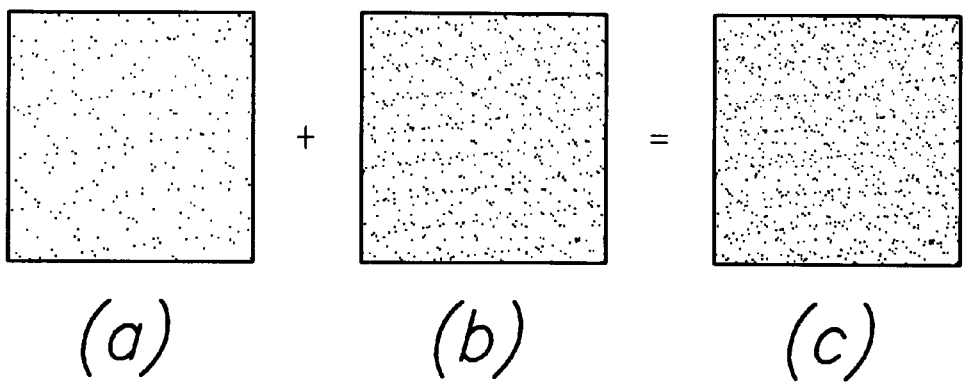
FIGS. 5 and 6 illustrate the effect of a bi-directional misalignment on the printed output of the system of an embodiment of the present invention.
Figure 6:
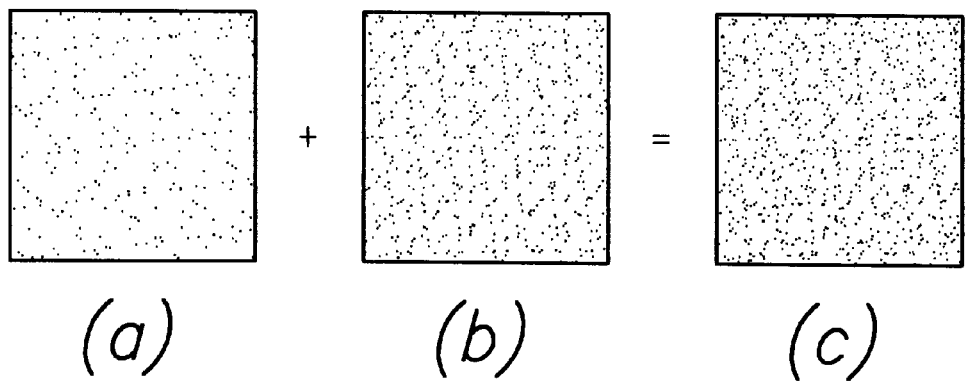

Referring to FIGS. 5 and 6, this benefit is illustrated graphically. FIG. 5a illustrates a portion of an exemplary area fill, printed using the method of the present embodiment, whilst the printheads were moving in the first direction. FIG. 5b illustrates the same portion of the area fill, printed whilst the printheads were moving in the reverse print direction. In this figure, no significant bi-directional misalignment is present and the competed exemplary area fill (i.e. FIG. 5a superimposed on FIG. 5b) is shown in FIG. 5c.

FIG. 6 illustrates the effect of a bi-directional misalignment on the printing performance of the system of the present embodiment when printing the exemplary area fill of FIG. 5. As was the case in FIG. 5, FIG. 6a illustrates the portion of the area fill printed whilst the printheads were moving in the reverse print direction and FIG. 6b illustrates the portion of the area fill, printed whilst the printheads were moving in the reverse print direction. The completed area fill (i.e. FIG. 6a superimposed on FIG. 6b) is shown in FIG. 6c. Due to the lack of dependency between the portions of the image printed in the different directions, no appreciable degradation in the print quality is noticeable in the completed area fill shown in FIG. 6c, relative to that printed by the system when no bi-directional misalignment is present, shown in FIG. 5c; i.e. there is little or no increased "patterning" or "clumpiness".

The inventor has found that this benefit may be achieved simply by halftoning the part of the image to be printed in one direction independently from the remainder of the image. In practice, the level of dependency between the positioning of drops printed in either print direction has been found to increase as the proportion of image data that is printed in each direction approaches 50%. However, the ratio of 60% of the image data being printed in one direction and 40% being printed in the other has been found to adequately reduce this dependency.

In a deterministic system, 50%/50% split of the color data will result in identical files to be printed in the first and second directions. This, however, is not desirable when attempting to remove the dependencies between the image data printed in each direction. Thus, unless a further perturbation is introduced into the system (such as applying different error diffusion weightings to the two direction-dependent halftoning processes, as discussed below), using a 50%/50% split of the color data is not desirable in aiming to achieve the advantages of the present embodiment.

Returning now to FIG. 2, at step 21, the controller 30 determines, that an even number of swaths have been printed. The process consequentially moves to step 25, where the controller 30 determines whether the current print job is completed or not; i.e. whether further swaths remain to be printed. In the event that further swaths remain to be printed, the process proceeds again to step 23.

At step 23, the controller 30 updates a further internal register identifying the data in color planes 78*a*–78*f* which has been printed in order to correctly identify the subsequent data in color planes 78*a*–78*f* which is to be included in the next swath to be printed in the reverse direction.

The controller 30 also updates the internal register identifying the print direction of the next swath to be printed, to indicate that the next swath is to be printed in the first print direction.

In this manner, the process of the present embodiment selects direction dependent halftone data from the appropriate direction dependent color planes at the correct time for processing and printing.

The process described with reference to steps 15 to 25 continues until the print job is complete at step 25, whereupon the printing operation of the present procedure is terminated at step 27.

FURTHER EMBODIMENTS

In the above description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

For example, the skilled reader will appreciate that dependency between the positioning of drops printed in each print direction may be reduced or indeed eliminated in a variety of ways.

By applying different error diffusion weightings to the two direction-dependent halftoning processes, the dependency may be reduced or even substantially eliminated. The extent to which the different error diffusion weightings should differ from one another will depend upon the image being printed and the characteristics of the system, including the printer and data processing techniques used. However, suitable different error diffusion weightings for use with the two direction-dependent halftoning processes may be found by routine experimentation.

The skilled reader will also appreciate that the direction dependent halftone data may also be processed using differing print masks in order to remove the dependency between the positioning of drops printed in the different print directions.

The manner in which image is allocated to one or other of the direction-dependent continuous tone color planes may be varied. In the above described embodiment, a simple 60%/40% split was used uniformly across each continuous tone color plane. The skilled reader will appreciate that this ratio may be varied. As has been commented above, the level of dependency between the positioning of drops printed in either print direction has been found to increase as the proportion of image data that is printed in each direction approaches 50%. Furthermore, it will be appreciated that if sufficient image data is printed in one print direction, it will begin to approximate unidirectional printing and thus lose the advantages of bi-directional printing. However, the skilled reader will appreciate that the 60%/40% ratio of the above embodiment may be varied significantly between these two extremes whilst retaining the benefits of the invention.

Furthermore, a method other than a simple uniformly split, common to each color plane, may be used to allocated continuous tone color data to one or other of the direction-dependent continuous tone color planes.

For example, the method may allocate a varying proportion of the color data to the respective direction-dependent color planes. This may be dependent upon the position of the color data in the image to be printed. For example, for each color plane, a varying distribution profile may be used. The varying distribution profile may resemble a corrugated surface, for example, situated within each color plane. The proportion of each color data value that lies below the corrugated surface may be allocated to be printed in the first direction and the proportion of each color data value that lies above the corrugated surface may be allocated to be printed in the reverse direction.

Clearly, the frequency of the corrugation may be varied to suit the type of image being printed and to avoid artefacts that are easily perceived by the human eye. Thus, in areas of comparatively continuous color a high frequency corrugation may be used since they are less easily noticed by the human eye. However, in such areas, it would be undesirable to use a low frequency corrugation may be very noticeable since it may result in a varying color hues across the area. Furthermore, the orientation of the corrugation (for example, whether the corrugation run horizontally, vertically or at another angle to the image to be printed) may also be varied to suit the image to be printed.

The skilled reader will appreciate that the characteristics and positioning of such a varying distribution profile may be generated by an algorithm or stored in a look up table internal or external to the printer.

Although the above-described embodiment was described with reference to plane dependent error diffusion halftoning, the skilled reader will appreciate that the present invention may equally be used to counter print defects that occur in bi-directional print modes as a result of a bi-directional error, whether or not plane dependent error diffusion halftoning is used. Thus it will be apparent that the separate halftoning of dots to be printed in different print directions may be used address problems caused by other types of dependency that occur when a bi-directional error is present in the printing system. For example dependencies may occur between pens. This may be between pens of different colors, the same color, or of varying dye levels, such as normal cyan and light cyan. Furthermore, intra-pen dependencies exist, in insofar as the position of dots of one color are determined generally from one source (the raster plane of that color), regardless of whether they are printed in a bi-directional print mode or not.

As will be apparent to the skilled reader, in recent times, the processes of rasterization, color mapping and halftoning are commonly carried out by hardware or firmware associated with the printer, in order to allow the host PC to be freed up for other tasks as soon as possible. However, it will be appreciated any combination of these processes may instead be carried out outside the printer; for example in the printer driver software running on the host PC. The skilled reader will thus appreciate that the process of splitting the halftone planes, at step 11 of FIG. 2, or carrying out the print mode processing at step 11 of FIG. 2 in a direction dependent manner may also be carried out by a controller not associated with the printer.

Furthermore, it will be apparent to the skilled reader that various process commonly applied to images during the half toning process may also be applied to the portions of the image that are printed in both the first print direction and the reverse print direction; for example: superpixelling and edge enhancement processes.

Although the above described embodiment was described with reference to a six color ink system, it could equally be applied to a printing system with an increased or decreased range of pens or colors. For example, the invention could be applied with benefit to a four color ink system having CMYK inks, or an octachrome system with CMYK, medium cyan, medium magenta, orange and green inks.

What is claimed is:

1. A method of generating with an inkjet printer system a halftone image from image data comprising a plurality of contone data values, said system comprising a printhead arranged to print drops on a print medium whilst moving relative to said print medium in first and second directions, said method comprising the steps of:
   generating a first plurality of halftone data, each of said first halftone data being generated from a first proportion of a corresponding contone data value;
   generating a second plurality of halftone data, each of said second halftone data being generated from a second proportion of a corresponding contone data value;
   printing drops corresponding to said first plurality of halftone data in said first direction; and,
   printing drops corresponding to said second plurality of halftone data in said second direction.

2. A method according to claim 1, wherein the first plurality of halftone data and the second plurality of halftone data are generated from the same contone data values.

3. A method according to claim 2, wherein said first and second proportions of each of said plurality of contone values are non-equal.

4. A method according to claim 2, wherein the sum of said first and second proportions of each of said plurality of contone values substantially equals the value of said corresponding contone value.

5. A method according to claim 4, wherein said first proportion lies in the range of 55% to 70% of said corresponding contone value.

6. A method according to claim 5, wherein said first proportion substantially equals 60% and said second proportion substantially equals 40% of said corresponding contone value.

7. A method according to claim 1, wherein said plurality of contone data values correspond to a color component of said image to be printed, and said generating and printing steps are repeated in respect of one or more further pluralities of contone data values, said one or more further pluralities of contone data values corresponding to one or more further color components of said image to be printed.

8. A method according to claim 7, wherein said generating and printing steps are implemented in respect of at least cyan and magenta color components.

9. A method according to claim 1, wherein the magnitude of said first and second proportion of each of said plurality of contone data values depends upon its respective location in said image.

10. A method according to claim 9, wherein each of said plurality of contone values is stored in a raster plane having first and second dimensions, the magnitude of said contone values being representable in a third dimension, and said first and second proportions of each of said plurality of contone data values varying across said raster plane such their relative proportions may be represented by a three dimensional surface substantially separating said first and second proportions of said plurality of contone data values.

11. A method according to claim 10, wherein said three dimensional surface is undulating or corrugated.

12. A method according to claim 11, wherein number of undulations or corrugations per unit distance across said image is selected so that the visual effect of artefacts caused by said three dimensional surface in said image and noticeable to the human eye is reduced.

13. A method according to claim 1, wherein said steps of generating halftone data are carried out using a plane dependent halftone process.

14. A method according to claim 13, wherein said step of generating said first plurality of halftone data utilises plane dependent error diffusion error weightings that are substantially different from those used to generate said second plurality of halftone data.

15. A method according to claim 1, further including the steps of applying first and second printmode masking processes respectively to said first and second pluralities of halftone data prior to printing, wherein said first and second printmode masking processes are substantially different.

16. A method according to claim 1, wherein said drops corresponding to said first plurality of halftone data and/or said drops corresponding to said second plurality of halftone data are distributed over substantially the whole of the image area of said image to be printed.

17. A method according to claim 1, wherein said steps of printing are carried out using a 2, 3, or 4 pass printmode.

18. A method according to claim 1, wherein said steps of generating are carried out in by a processor associated with said inkjet printer system.

19. A method according to claim 1, wherein said steps of generating are carried out in by a processor external to said inkjet printer system, for such as a processor associated with a PC or CAD system.

20. A method of generating a halftone image from a plurality of contone data values, with an inkjet printer employing a bi-directional print mode, the method comprising the steps:
   generating first and second sets of halftone data values from said plurality of contone data values, said first and second sets comprising substantially different data values;
   printing elements of the image corresponding to said first set of halftone data values in a first print direction;
   printing elements of the image corresponding to said second set of halftone data values in a second print direction.

21. A method of generating a halftone image from contone image data for printing with an inkjet device having first and second print directions, comprising the steps of:
   generating substantially different first and second sets of halftone image data from said contone image data;
   printing a first halftone image corresponding to said first set of halftone image data in said first print direction;
   printing a second halftone image corresponding to said second set of halftone image data in said second print direction, superimposed on said first halftone image.

22. A method of generating a halftone print file or halftone print data from contone image data, for printing with an inkjet device having first and second print directions, comprising the steps of:
   generating substantially different first and second sets of halftone image data from said contone image data;
   allocating the halftone image data of said first set to print operations in the first direction;
   allocating the halftone image data of said second set to print operations in the second direction.

23. A computer program comprising program code means for performing the method steps of any one of claims 1 to 22 when said program is run on a computer and/or other processing means associated with suitable printer device.

24. A printer device arranged to implement the method of any one of claims 1 to 22.

25. An incremental printer system, comprising a printhead arranged to print drops on a print medium whilst moving relative to said print medium in first and second directions, said system being arranged to generate first and second halftone data from a plurality of contone data values, each first halftone data being generated from a first proportion of a corresponding contone value, each second halftone data being generated from a second proportion of a corresponding contone value, said system being further arranged to print drops corresponding to said first plurality of halftone data in said first direction and to print drops corresponding to said second plurality of halftone data in said second direction.

* * * * *